April 15, 1958
F. SCHMIDT
2,831,061
CIRCUIT ARRANGEMENT FOR TRANSMITTING
SIGNAL OVER TELEPHONE LINES
Filed Aug. 3, 1953
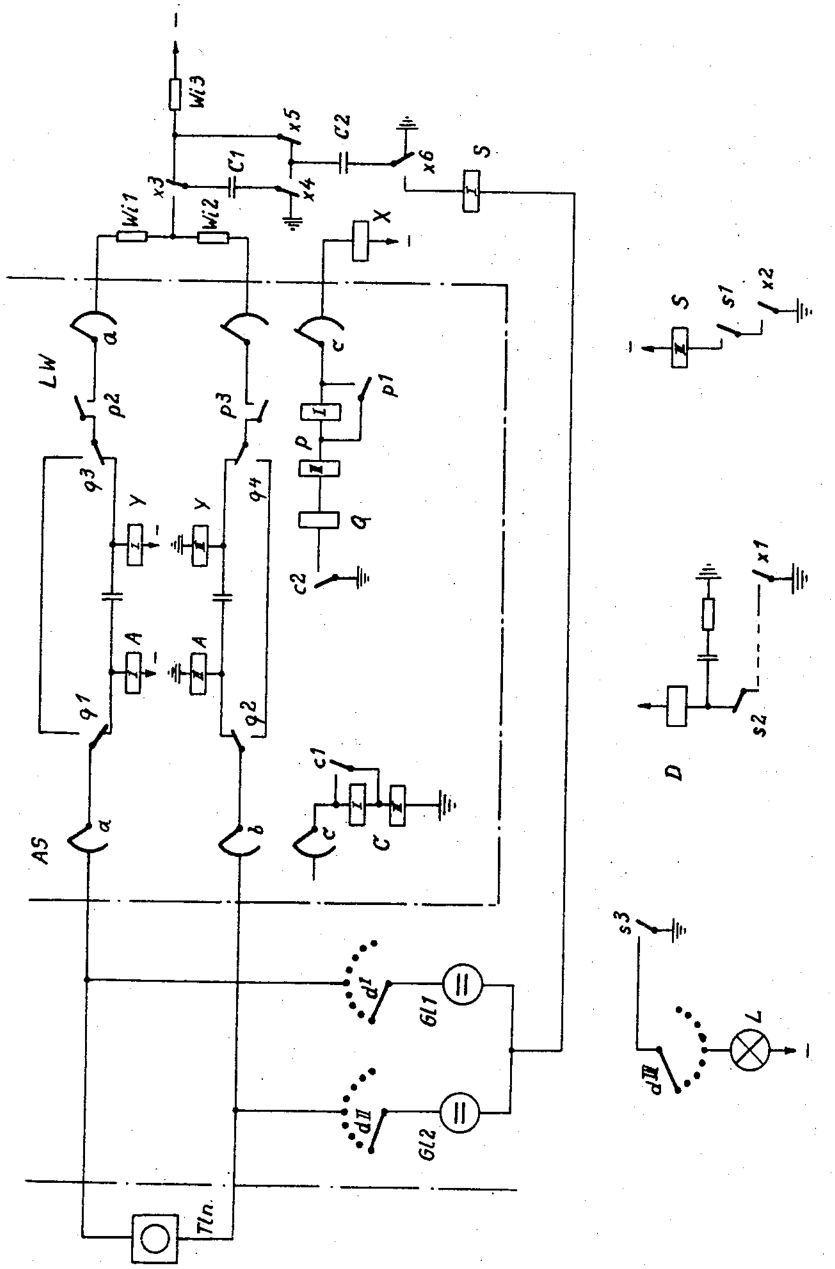
INVENTOR
F. SCHMIDT
BY
ATTORNEY United States Patent Office 2,831,061
Patented Apr. 15, 1958

2,831,061

CIRCUIT ARRANGEMENT FOR TRANSMITTING SIGNAL OVER TELEPHONE LINES

Fritz Schmidt, Stuttgart-Zuffenhausen, Germany, assignor to International Standard Electric Corporation, New York, N. Y., a corporation of Delaware Application August 3, 1953, Serial No. 371,894

Claims priority, application Germany August 2, 1952

7 Claims. (Cl. 179—5)

This invention relates to circuit arrangements for transmitting signals, such as night watchmen's reports, over telephone lines.

The advantages of installing signal systems, such as fire alarm systems or watchman control systems, are well known since such systems serve to protect health and life, as well as valuable wares, but when considered from an economical standpoint such systems are sometimes not worth while since they are expensive to install and are used for relatively short periods. In assessing the cost of such systems a major item is the line network and it has, therefore, become the practice to endeavor to use some line network which is already existing and is being used for some other purpose. For instance, it has been known for a considerable period to transmit fire alarm signals and police alarm signals over one and the same network and large systems have also been put into practice in which the telephone network has been used for fire and police alarm purposes.

These considerations have also led to the combining of watchmen's control systems with the telephone network. Since the telephone network is little used during the night hours for telephone conversations a greater economy of the installation can be achieved if the watchmen's control reports may also be transmitted over the telephone lines to a central position. In view of the fact that signals are sent from the watchmen's stations only a few times during the night, there is no material impairment of the telephone service.

The present invention relates to a circuit arrangement for transmitting signals, such as watchmen's control reports, over telephone lines. In order to supervise watchmen who are making their rounds through a building or area, it is customary to locate the signal boxes at predetermined points, and when making his rounds the watchman has to operate these signal boxes and the reporting central office is apprised where the watchman is at any particular time. It is also customary to use a time stamp in order that it may be later determined from what location and at what time the watchman sent in his report. It has been proposed to bridge such watchmen's signal boxes across a number of the station lines of a telephone installation, but the objection to this procedure is that very little damping effect on the telephone lines can be tolerated. In one arrangement which avoids this difficulty, signal receiving means is connected to the end of an incoming line in front of the exchange equipment which can only be rendered effective when a particular voltage source is applied to the telephone line at a telephone station by the watchman or other signal transmitter at the signal transmitting point. It has also been suggested to prepare the signal receiving means when a particular selecting device has been seized in such manner that dependent upon a switching operation at the signal transmitting point the telephone line from the incoming end to the exchange equipment is disconnected and the signal receiving means connected. The disadvantage of such a system is that a special voltage source is required which can only be applied under control of the person sending the signal and, therefore, the night watchman is compelled to carry an additional battery with him in order to send a report from a telephone station. Moreover, when any of the above referred to solutions are used changes have to be made in the telephone system in order to adapt it for transmitting such signals, for example, a plug and jack arrangement has to be provided at the telephone station for connecting up the additional voltage source.

One object of the present invention is to provide a means for transmitting signals over telephone lines in an economical and operationally safe manner using the normal telephone station equipment without the provision of any special additional apparatus.

According to one feature of my invention when a certain code number is dialled from a telephone station in order to transmit a reporting signal, switching means is operated which completes a reverse control circuit extending over the speaking wires and a by-pass line to operate signal receiving means which indicates the transmission of a signal. According to a further feature an additional selector switch is taken into use when the particular code number is dialled and automatically hunts for the telephone station from which the signal is being sent and then closes the reverse circuit.

The above and other features of my invention will be better understood from a consideration of the following description of one embodiment of my invention in conjunction with the accompanying drawing. In this arrangement the telephone system is assumed to be of the kind in which a connection is completed over a call finder and a selector, but it will be understood that the invention is not limited to this application and may be applied to any type of telephone system.

In the drawing, as is now customary in the telephone switching art, the relay contacts are shown detached from their respective windings but the contacts are identified with the particular relays by using capital letters for the relays and small case corresponding letters for the associated contacts.

Watchmen's control reports are intended to be transmitted from certain of the stations of the telephone network at selected points and over the telephone lines to a central position. When a night watchman in maknig his rounds arrives at a subscriber's station T from which he is required to send out a control report, he removes the receiver of the station whereupon in a well known manner a call finder AS in the central office is set upon the contacts at the calling line.

Relay C is thereby operated over the *c* wire and at its contacts *c*1 short circuits its winding I to mark the calling line busy. The watchman now dials a particular code number allocated for the purpose and in well known manner causes the wipers of the selector LW to be set on the contacts of a certain outlet over which access is given to special equipment at a signal receiving position. A circuit is thereby closed for the relay X extending from ground, make contacts *c*2 of relay C, winding of relay Q, windings II and I of relay P and test wiper *c*. The test relay P at its contacts *p*1 short circuits its winding I to mark the engaged outlet busy and at contacts *p*2 and *p*3 switches through the upper and lower talking conductors. Relay Q also energizes and at its make contacts *q*1, *q*2, *q*3 and *q*4 completes a galvanic connection between the talking wipers of the call finder AS and of the selector LW.

At the special position accessible from the outlet in question two condensers C1 and C2 were previously connected in charging circuits extending from negative battery, resistance W3, break contacts *x*3, condenser C1 to ground over break contacts *x*4; and negative battery, resistance W3, break contacts $x5$, condenser C2, break contacts $x6$ to ground. Relay X operates when the special position is engaged and at contacts $x3$, $x4$, $x5$ and $x6$ disconnects the condensers C1 and C2 from battery and connects them in series, whereby the potential across such condensers is doubled. At the same time a circuit is closed at make contacts $x1$ for the stepping magnet of a special hunting switch D assigned to the position, which switch automatically advances in well known manner. The hunting switch D is provided with wipers $d$I, $d$II which respectively engage contact rows to the terminals of which are connected the talking wires of those telephone stations from which the watchmen's control reports are to be transmitted. A third wiper $d$III engages a third row of terminals to the contacts of which are connected indicating lamps or the like. When the wipers $d$I and $d$II engage the terminals of the telephone line connected to the station from which the watchman is sending his report, the following reverse control circuit is closed: Glow lamp GL1, wiper $d$I, upper talking conductor, wiper $a$ of call finder AS, make contacts $q1$, $q3$, $p2$, wiper $a$ of selector LW, resistance W1; and in parallel glow lamp GL2, wiper $d$II, lower talking conductor, wiper $b$ of call finder AS, contacts $q2$, $q4$, $p3$, wiper $b$ of selector LW, resistance W2; and over make contacts $x3$, condenser CI, make contacts $x4$, condenser CII, make contacts $x6$, winding I of relay S.

The condensers CI and CII discharge in the above described circuit, the glow lamps GL1 and GL2 simultaneously ignite, and the signal receiving relay S is thereby operated. Relay S closes a holding circuit for itself over make contacts $x2$ and $s1$, at break contacts $s2$ opens the circuit of the stepping magnet of the switch D and at make contact $s3$ closes a circuit for the indicating lamp or other device L over wiper $d$III, which indicates the identity of the station from which the watchman is sending his report. Obviously it is also possible to additionally or alternatively actuate a time stamping device over the last-mentioned circuit which will record the time at which the night watchman sent in his report from the particular station. The switching equipment is released in well known manner when the night watchman replaces the receiver at the telephone station from which he is making his report.

It will be noted that when the watchman transmits a report in the manner described, a reverse control circuit is closed over the parallel connected talking conductors of the engaged switching equipment AS and LW, the parallel connected glow lamps GL1 and GL2 and the bypass circuit which extends from the lamps to the signal receiving relay. As has already been stated, the condensers CI and CII connected in series serve as the source of current for operating the relay S.

The striking voltage of the glow lamps GL1 and GL2 is so high that the normal supply voltage of the exchange battery cannot cause these lamps to ignite and therefore no disturbance of the speaking circuit during the normal call can take place, although it is possible that the two wipers $d$I and $d$II and the lamps GL1 and GL2 may be bridged across the speaking wires. The lamps are only ignited when the operation of relay X switches over the contacts $x3$—$x6$ and causes the two condensers CI and CII to be connected in series and thus to supply double battery potential.

Thus, the invention makes it possible to utilize subscriber telephone lines for signal purposes without making any changes in the existing telephone office equipment or sub-station equipment. By the provision of the special hunting switch D which automatically finds the signalling station, it is possible to identify positively the station from which the signal is being transmitted. Moreover, the arrangement according to my invention has the great advantage that the watchman does not have to carry a bulky additional potential source with him.

What is claimed is:

1. A system for transmitting special signals over the telephone line pairs of a network including a plurality of stations and switching means at an exchange office for completing connections between said stations, comprising a signal receiving position accessible over a particular outlet from said switching means, indicating means at said signal receiving position for indicating the identity of stations from which said special signals are sent, other switching means at said exchange office having access to the line pairs of telephone stations from which said special signals are required to be sent, means responsive to a pretermined code transmitted from a station for causing said outlet to be seized by said switching means, means responsive to the seizure of said outlet for causing said other switching means to hunt for the station line pair over which the said signal code has been transmitted, a reverse control circuit including at least one speaking wire of said line pair and a by-pass connection over contacts of said other switching means, means for energizing said reverse control circuit responsive to the enegagement of said line pair by said other switching means and means included in said reverse control circuit for actuating said indicating means.

2. A system according to claim 1 in which said reverse control circuit includes both wires of said line pair extending through said switching means connected in parallel.

3. A system according to claim 1 in which a condenser is included in said reverse control circuit and also last-mentioned means comprises a relay which is energized by a discharge from said condenser.

4. A system according to claim 2 further comprising a glow lamp in each of the respective parallel connections extending over said line pair whereby said reverse control circuit is energized only when the voltage therein is sufficient to ignite said glow lamps.

5. A system according to claim 4 in which the ignition voltage of said glow lamps exceeds the voltage of the exchange battery and further comprising two condensers, and means for discharging said condensers in series in said reverse control circuit to cause ignition of said glow lamps when the latter circuit is completed.

6. A system according to claim 1 further comprising a holding circuit for said relay, means for closing said holding circuit upon the completion of said reverse control circuit and contacts on said relay for opening the driving circuit of said other switching means when said relay is energized.

7. A system according to claim 2 further comprising a relay, means for energizing said relay when said switching means engages said particular outlet and contacts on said relay for completing galvanic connections over said line pair extending through said switching means.

References Cited in the file of this patent

UNITED STATES PATENTS

| | | |
|---|---|---|
| 2,078,842 | Friendly | Apr. 27, 1937 |
| 2,282,564 | Crocker | May 12, 1942 |
| 2,297,365 | Ostline | Sept. 29, 1942 |
| 2,338,242 | Haigh | Jan. 4, 1944 |
| 2,376,346 | Deakin | May 22, 1945 |